United States Patent Office 2,993,006
Patented July 18, 1961

2,993,006
TREATMENT OF VEGETABLE OIL WASH WATERS
Ernest E. Allen and George J. Wack, Decatur, Ill., assignors to A. E. Staley Manufacturing Company, Decatur, Ill., a corporation of Delaware
No Drawing. Filed Mar. 3, 1958, Ser. No. 718,500
3 Claims. (Cl. 252—326)

This invention relates broadly to improvements in the breaking of aqueous emulsions of fatty materials. More specifically, it relates to improvements in the coagulation or breaking of aqueous fatty emulsions with the aid of dissolved lignin, whereby recovery of the emulsified fatty material is facilitated and the biological oxygen demand (B.O.D.) of the clarified aqueous phase is reduced.

Large quantities of crude vegetable oils such as those derived from corn, grain sorghum, soybeans, cottonseed, and peanuts are refined for both edible and non-edible uses requiring low contents of impurities. There are several different commercial methods of refining vegetable oils, and they vary as to the degree of refining produced. A simple method, and one which produces a low degree of refining, consists of thoroughly mixing a small proportion of water with the warm crude oil, then separating the aqueous and oil phases. This refining method, known as ordinary water degumming, removes about 90% of the phosphatides in the crude oil as an aqueous sludge or thick emulsion. The sludge, or wet gum as it is commonly known, also contains some of the free fatty acids and unsaponifiable materials in the crude oil, but it does not contain much of the colored impurities.

A higher degree of refining is obtained by the use of selected non-alkaline reagents in the ordinary water degumming operation. Chief among these are the organic and inorganic acids, salts of strong acids and strong bases, and certain reactive organic compounds such as acetic anhydride and ketene. These reagents, added to the degumming water or to the crude oil, bring about a substantially complete removal of phosphatides and yield a break-free oil. An example of the process, based on the use of acetic and other organic acid anhydrides, is described in U.S. Patent 2,782,216. Except for the complete removal of phosphatides, the foregoing modified water degumming of vegetable oils produces essentially the same degree of refining as ordinary water degumming.

A still higher degree of refining is obtained by the conventional alkali refining methods. There are a number of these methods, depending upon the particular alkaline reagent or combination of such reagents used. In all cases, however, the method removes substantially all of the phosphatides and free fatty acids as a sludge or thick emulsion known as soap stock or foots. Colored impurities are also removed to varying degrees depending upon the crude oil and the alkaline reagent. Crude corn oil and particularly crude cottonseed oil are markedly color refined by concentrated aqueous solutions of the caustic alkalies such as sodium hydroxide.

It is well-known that in all of the foregoing refining methods, processing conditions must be carefully controlled to obtain a clean and efficient separation of gum or soap stock from oil. The ideal refining procedure is one which yields a gum or soap stock containing little or no free oil and an oil containing little or no suspended particles of gum or soap stock. In commercial operations, however, ideal conditions seldom prevail, and it is common practice to sacrifice some oil in the gum or soap stock and permit some of the latter to remain suspended in the oil after the primary separation of phases. The residual gum or soap stock is best removed from the oil by a water wash. The resulting wash water always contains some emulsified oil which cannot be economically recovered by conventional centrifuging or gravity settling methods. Furthermore, since the suspended gum or soap stock assists emulsification, the proportion of emulsified oil in the wash water usually increases with the proportion of gum or soap stock.

The disposal of waters containing low proportions of emulsified fatty materials presents a problem whose solution varies with the location of the factory and the nature and amount of emulsified material. Occasionally, it is profitable to recover the fatty material by evaporation or by installation of special centrifuges. Usually, however, such recovery methods are not profitable, and it is then a question of discharging the wash water to a sewage disposal plant, or to a natural large body of water, or treating the wash water in some way to reduce its load of organic material.

Waters containing more than a small fraction of one percent of fatty material impose a large B.O.D. load on sewage disposal plants. Also, discharging such wastes into a natural large body of water is objectionable because of the associated pollution. Consequently, increasing attention is being given to coagulation and precipitation methods for recovering the emulsified fatty material and reducing the B.O.D. of the treated water.

The use of soluble lignin products to coagulate colloidally suspended materials (including fatty materials) from aqueous media is known. Suuch use is described in U.S. Patents 2,200,784, 2,415,439, and 2,784,161. The last patent discloses specifically the clarification of oily wash waters obtained in the alkali refining of corn and soybean oils.

The coagulating action of lignin, used on aqueous fatty emulsions as described in U.S. Patents 2,200,784 and 2,784,161, decreases with increasing proportion of emulsifier, such as wet gum or soap stock, in the emulsion.

We have discovered that the coagulating power or efficiency of lignin, in the foregoing situations, can be restored by supplementing the lignin with a soluble aluminate, e.g., sodium aluminate. As will be shown in the following examples, the coagulating effect of a combination of lignin and aluminate is greater than the sum of the separate effects.

Our discovery provides for greater low cost recovery of fatty materials from aqueous fatty emulsions, and greater low cost reduction of B.O.D. in fatty wash waters than was heretofore possible with lignin alone.

Although our invention is directed primarily to coagulation of fatty materials in vegetable oil wash waters, it it applicable to aqueous emulsions of fatty materials in general. The fatty materials may be synthetic or natural, and if the latter, they may be either animal or vegetable in origin. Nor is our invention limited in its application to fatty wash waters or aqueous emulsions formed during the processing or refining of animal, vegetable, or synthetic fats and oils. It may, for example, be useful in breaking emulsions formed during the cleaning of fat processing equipment, particularly when the cleaning is done with alkaline solutions.

The principal broad object of our invention is the provision of an inexpensive, convenient, and effective method for coagulating colloidally suspended fatty materials in aqueous media, whereby the fatty materials can be readily separated from the medium and recovered, if desired, and the clarified medium can be sewered or discharged into a natural body of water with a greatly reduced biological oxygen demand.

A more specific object of our invention is the improvement of the known processes for coagulating aqueous fatty emulsions with lignin.

A still more specific object of our invention is the improvement of the known processes for coagulating aqueous fatty emulsions with lignin as applied to fatty wash waters obtained during the refining of vegetable oils.

For a more complete understanding of our invention reference may now be had to the following detailed examples thereof, wherein selected illustrative embodiments of the invention are described and others are suggested.

EXAMPLE 1

This example illustrates the application of our invention to a wash water obtained in the manufacture of break-free soybean oil by acetic anhydride degumming of the crude oil as described in United States Patent 2,782,216. The wash water, as discharged from the centrifuge, had a butter yellow color, a temperature of 150° F., a pH of 5.2, a total fatty material (TFM) content of 2.7% by weight, and a B.O.D. of about 50,000. A quantity of 13,300 gals. (100,000 lbs.) was collected in an 18,000 gallon tank. Its temperature was raised to 165° F. with injected steam and its pH was raised to 11.5 by addition of 50% aqueous caustic soda solution while the contents of the tank were agitated with a stream of compressed air. With continued air agitation, 25 pounds of sodium aluminate was dissolved and mixed with the warm wash water at 11.5 pH. After 5–10 minutes agitation to insure good distribution of the aluminate, 75 pounds of alkali-soluble lignin was added to the wash water. After an additional 10–15 minutes of vigorous air agitation to insure uniform distribution of both aluminuate and lignin, the pH of the wash water was reduced to pH 2 by appropriate addition of strong sulfuric acid. The pH adjustment required about 20 minutes. Stirring was continued for 10 minutes, then discontinued. At this point, a pronounced breaking or separation of the wash water emulsion was noted. The contents of the tank were allowed to stand about four hours, during which time a distinct oily layer appeared on top. The lower water layer was sent to the sewer and the fatty layer was saved. The B.O.D. of the sewered water was reduced to about 2000 or to 4% of the original value of 50,000.

EXAMPLE 2

In this example, the same quality of wash water was treated as described in Example 1 except that the sodium aluminate was omitted. The lignin treatment caused a substantial coagulation of the emulsified fatty material, but not to the degree obtained in Example 1. The clarified wash discharged to the sewer had a B.O.D. of about 4000.

EXAMPLE 3

The procedure of Example 1 was applied to a lower B.O.D. wash water obtained in the manufacture of break-free soybean oil by acetic anhydrite degumming of the crude oil as described in United States Patent 2,782,216. The wash water was cream colored, had a temperature of 150° F., a pH of 5.5, a TFM content of 2.0% by weight, and a B.O.D. of about 36,000. After treatment with the combination of lignin and sodium aluminate, the clarified and separated wash water had a B.O.D. of only 1200.

EXAMPLE 4

Repetition of Example 3, omitting the sodium aluminate, gave a clarified wash water with a B.O.D. of 1700.

EXAMPLE 5

The procedure of Example 1 was applied to a wash water obtained in the manufacture of break-free soybean oil by acetic anhydride degumming of the crude oil as described in United States Patent 2,782,216. The wash water had a milk-white color, a temperature of 150° F., a pH of 5.6, a TFM content of 1.6% by weight, and a B.O.D. of 30,000. The clarified and separated wash water had a B.O.D. of only 850.

EXAMPLE 6

Repetition of Example 5, omitting the sodium aluminate, gave a clarified wash water with a B.O.D. of 1200.

EXAMPLE 7

This example illustrates the application of our invention to a wash water obtained in the alkali refining of corn oil. The wash water, as discharged from the centrifuge, had a milk-white color, a temperature of 150° F., a pH of 11.2, a TFM content of 0.95% by weight, and a B.O.D. of 17,000. It was collected and treated in an 18,000 gallon tank with a combination of sodium aluminate and lignin as described in Example 1. The clarified and separated wash water has a B.O.D. of 700.

EXAMPLE 8

Repetition of Example 7, omitting the sodium aluminate, gave a clarified wash water with a B.O.D. of 1050.

Foregoing Examples 1, 3, 5, and 7 illustrate the preferred commercial application of our invention to certain wash waters obtained in the refining of vegetable oils.

Small scale laboratory tests depicted in Table I further illustrate the application of our invention to the coagulation of aqueous fatty emulsions. In addition to showing the influence of variation in processing conditions (temperature, pH, and reagent ratios) on coagulation efficiency, the test results show that on a given emulsion, aluminate alone is relatively ineffective, lignin alone is fairly effective, but lignin plus aluminate is still more effective.

Procedure—water (1500 gms.), alkali refined soybean oil (60 gms.), and wet soybean oil gum or wet corn oil soap stock (as shown by the table) are thoroughly mixed by violent agitation for one minute in a Waring Blendor. The emulsion thus obtained is warmed to the temperature shown in the table, adjusted to the indicated alkaline pH with 50% aqueous sodium hydroxide, mixed with the indicated amounts of sodium aluminate and lignin, acidified to the indicated acid pH with strong sulfuric acid, then allowed to stand four hours to permit separation of coagulated fatty material (upper layer) from clarified aqueous phase (lower layer). B.O.D. of the clarified aqueous phase was then measured, as shown in the table. B.O.D. of the original emulsions all exceeded 50,000.

*Table I*

| Test No. | Wet Soybean Oil Gum (gms.) | Wet Corn Oil Soap Stock (gms.) | Alkaline Emulsion, pH | Emulsion Temp. (° F.) | Sodium Aluminate (gms.) | Lignin (gms.) | Acidification, pH | B.O.D. in Clarified Water |
|---|---|---|---|---|---|---|---|---|
| 1 | 30 | 0 | 11.5 | 165 | 0 | 1.12 | 2.0 | 25,000 |
| 2 | 7.5 | 0 | 11.5 | 165 | 0 | 1.12 | 2.0 | 4,600 |
| 3 | 3.8 | 0 | 11.5 | 165 | 0 | 1.12 | 2.0 | 2,500 |
| 4 | 1.9 | 0 | 11.5 | 165 | 0 | 1.1° | 2.0 | 1,600 |
| 5 | 15 | 0 | 11.5 | 165 | 0.75 | 1.12 | 2.0 | 1,000 |
| 6 | 15 | 0 | 11.5 | 165 | 1.12 | 1.12 | 2.0 | 940 |
| 7 | 0 | 30 | 11.5 | 165 | 0 | 1.12 | 2.0 | 16,000 |
| 8 | 0 | 15 | 11.5 | 165 | 0 | 1.12 | 2.0 | 9,000 |
| 9 | 0 | 5 | 11.5 | 165 | 0 | 1.12 | 2.0 | 2,700 |
| 10 | 0 | 15 | 11.5 | 165 | 0.4 | 1.12 | 2.0 | 650 |
| 11 | 0 | 15 | 11.5 | 165 | 0.8 | 1.12 | 2.0 | 500 |
| 12 | 6 | 0 | 10.5 | 165 | 0.4 | 1.12 | 2.0 | 750 |
| 13 | 6 | 0 | 12.5 | 165 | 0.4 | 1.12 | 2.0 | 640 |
| 14 | 6 | 0 | 11.5 | 165 | 0.4 | 0.75 | 2.0 | 600 |
| 15 | 6 | 0 | 11.5 | 165 | 0.4 | 1.50 | 2.0 | 520 |
| 16 | 6 | 0 | 11.5 | 165 | 0.4 | 1.12 | 1.0 | 600 |
| 17 | 6 | 0 | 11.5 | 165 | 0.4 | 1.12 | 3.0 | 700 |
| 18 | 6 | 0 | 11.5 | 100 | 0.4 | 1.12 | 2.0 | 680 |
| 19 | 6 | 0 | 11.5 | 135 | 0.4 | 1.12 | 2.0 | 600 |
| 20 | 6 | 0 | 11.5 | 185 | 0.4 | 1.12 | 2.0 | 550 |
| 21 | 6 | 0 | 11.5 | 165 | 1.12 | 0 | 2.0 | 14,000 |
| 22 | 6 | 0 | 11.5 | 165 | 0 | 1.12 | 2.0 | 1,350 |
| 23 | 6 | 0 | 11.5 | 165 | 0.28 | 1.12 | 2.0 | 580 |

It is evident from Table I that the beneficial action of aluminate, in conjunction with lignin, occurs over fairly wide ranges of temperature, ratios of lignin to total emulsion, ratios of lignin to aluminate, and pH values at which the lignin is dissolved and precipitated. The table also shows that aluminate alone is relatively ineffective for breaking the emulsions and reducing the B.O.D.

The beneficial action of aluminate in combination with lignin applies to aqueous fatty emulsions in general. It is not limited to emulsions of corn and soybean oils, as shown in the foregoing examples, or to the illustrative emulsion concentrations. Also, our invention is not restricted to sodium aluminate. Any other soluble aluminate, such as potassium aluminate, is equivalent to sodium aluminate.

As pointed out earlier, our invention is an improvement on the lignin coagulation of aqueous fatty emulsions. The improvement consists essentially of having a soluble aluminate co-dissolved or co-dispersed with the lignin so that when the latter is coagulated by appropriate change in pH of the emulsion, the aluminate can assist the lignin in "breaking" the emulsion. We do not know the mechanism by which the aluminate helps lignin to "break" fatty emulsions, and prefer not to offer a speculative explanation.

In general, the best mode of carrying out our invention corresponds to the best mode of performing the lignin coagulation in a given instance. If the emulsion is a typical vegetable oil refinery wash water, preferred process conditions are as follows: wash water temperature, 140–170° F.; pH of wash water during aluminate and lignin dissolving step, 11–12; pH of wash water during lignin coagulation step, 2–2.5; weight ratio of lignin to total emulsion, 0.0005 to 0.0010; weight ratio of aluminate to lignin, 0.25 to 0.5.

It is to be pointed out, however, that some coagulation or "breaking" of aqueous fatty emulsions can be obtained with lignin under conditions rather far removed from the foregoing preferred conditions, and that the results will be improved by the conjunctive use of a soluble aluminate in accord with our invention. The temperature of the water can be much cooler or warmer than the preferred range of 140–170° F., the alkaline pH of the water can be appreciably higher or lower than the preferred range of 11–12, and the ratios of lignin to total emulsion and to aluminate can vary widely from the preferred ranges.

It is not essential to our invention that the wash water or emulsion be made alkaline so that the lignin can be dissolved therein. The lignin and aluminate can be dissolved separately with aqueous alkali, preferably to a rather concentrated solution, then added to the emulsion. For best results, however, it will be necessary for the emulsion to be neutral or slightly alkaline at this stage. Otherwise the lignin will precipitate as it is mixed with the emulsion. If the emulsion is initially neutral, and the lignin thoroughly dissolved in a separate alkaline solution, mixture of the two will yield an emulsion with a pH of at least about 9.0. The minimum pH at which lignin will dissolve to a concentrated solution is about 9.5. Also, commercial preparations of lignin are available which dissolve in water alone, yielding alkaline solutions with a pH of about 9.5.

The order in which the aluminate and lignin are added to the emulsion is not critical. In practcie, we have found it somewhat advantageous to add the aluminate first.

The preparation of lignin suitable for the coagulation of fatty emulsions is described in U.S. Patents 2,200,784 and 2,415,439. And, as mentioned earlier, it is commercially available.

Preferably, the alkaline emulsion containing dissolved aluminate and lignin is acidified to about 2 pH to coagulate the lignin and "break" the emulsion, but useful results are obtained with any acidification pH within the range of 1–3.

We claim:

1. In the method of treating wash water obtained during the refining of vegetable oils so as to recover the fatty values therefrom and lower the B.O.D. value thereof, which consists of preparing a solution of lignin in said wash water at a pH of about 11–12 and a temperature lying within the range of about 140°–170° F., then acidifying the solution within said temperature range to a pH within the range of about 1–3 and separating the resultant supernatant fatty layer from lower water layer, the improvement consisting of adding sodium aluminate to the wash water prior to said acidification, the amount of said lignin being within the range of about 0.05% to about 0.10% by weight based on said wash water and the amount of said sodium aluminate being within the range of 25% to 100% by weight of said lignin.

2. A method according to claim 1 wherein the wash water is one obtained during the refining of soybean oil.

3. A method according to claim 1 wherein the wash water is one obtained during the refining of corn oil.

References Cited in the file of this patent

UNITED STATES PATENTS

| | | |
|---|---|---|
| 2,200,784 | Wallace | May 14, 1940 |
| 2,415,439 | Nelson | Feb. 11, 1947 |
| 2,784,161 | Foley | Mar. 5, 1957 |